June 30, 1970     M. E. PLYMPTON     3,518,146

METHOD OF MAKING SIMULATED INLAID DESIGNS

Filed March 25, 1966

INVENTOR.
MARVIN E. PLYMPTON
BY
Tim Sherrard, atty

United States Patent Office 3,518,146
Patented June 30, 1970

3,518,146
METHOD OF MAKING SIMULATED INLAID DESIGNS
Marvin E. Plympton, San Diego, Calif.
(507 Maitland St., Imperial Beach, Calif. 92032)
Filed Mar. 25, 1966, Ser. No. 544,055
Int. Cl. B29c 9/00
U.S. Cl. 156—245        3 Claims

ABSTRACT OF THE DISCLOSURE

A method of manufacturing ornamental objects with simulated inlaid designs in which a partially gelled thermosetting resin is covered with a second thermosetting resin, a design sheet is immersed in the second resin, and a simulated inlaid material is placed in the second resin to completely cover the area of design.

---

This invention relates to a method of manufacturing ornamental objects provided with materials that give the appearance of being inlaid therein.

The object of my novel method is to prepare materials with inlaid design appearance without usual time and skill involved in conventional preparation.

A further object provides such design which can be mass produced utilizing assembly line techniques.

A further object is to facilitate a great variety of designs.

A still further object is to provide a method which can use a great variety of materials and a great variety of uses for completed object.

Other objects of the present invention are to provide a device of the above type which is of simple construction, inexpensive to manufacture and efficient to operate.

Figure 1:
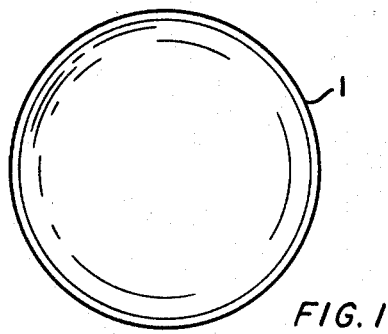
Figure 2:
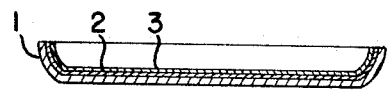
Figure 3:
Figure 4:
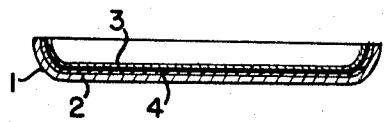
Figure 5:
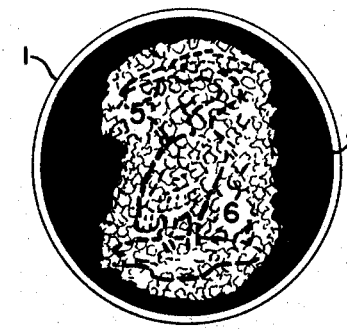
Figure 6:
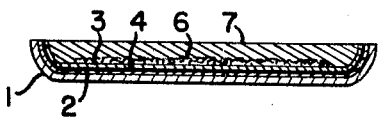
Figure 7:
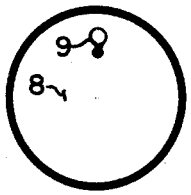
Figure 8:

For other objects and for a better understanding of the invention, reference may be had to the following detailed description taken in connection with the accompanying drawing in which:

FIG. 1 is a top view of a mold,
FIG. 2 is a cross-section view of the first operation in the mold,
FIG. 3 is a top view of a sheet containing design,
FIG. 4 is a cross-section view of the mold and contents before adding simulated inlaid material,
FIG. 5 is a view thereof after adding said material,
FIG. 6 is a cross-section view of mold and contents upon completion of mold process,
FIG. 7 is a view of the backside of product,
FIG. 8 is a view of final product from front thereof.

Referring to the drawing showing the preferred structure and in which like numbers represent like parts, in FIG. 1 the number 1 designates an inert mold. It has a smooth, flat, polished surface completely surrounded by walls or sides. I prefer to use a cylindrical shape mold of approximately 6 inches in diameter.

A transparent face retainer of the finished product is formed by pouring a polyester resin, mixed for solidifying into the mold. This is item number 2 in my drawing. For each trivet of average size (6 inches in diameter) I prefer to mix 4 ounces of the usual clear polyester resin with 8 drops of hardening catalyst. This is poured into the mold approximately ⅛ inch deep. It is allowed to set until it is semi-hard. This takes about 20 minutes.

Thereafter a second resin, indicated as numeral 3, of like composition and quantity is poured over said first resin. These two "pours" form a transparent face retainer for the finished product.

Next an opaque sheet 4 with an ornamental design 5 cut out of a portion thereof is immersed into resin 3 whereby it becomes a layer between resin 2 on one side and resin 3 on the other side as shown in FIG. 4. I prefer to use an acetate plastic sheet of .005 inch thickness. It is smoothed and carefully immersed to avoid air pockets thereunder. The darkened or opaque area is preferably formed by reversing the usual silk screen operation. Thusly a desired design 5 is transparent and vinyl ink blackouts the surface around the design. Of course a great variety of designs may be used.

Promptly thereafter simulated inlaid material 6 is placed onto sheet 4 into resin 3 in contact with sheet 4. This naturally completely covers the transparent area of design 5 and extends into the opaque area as is best shown in FIG. 5. I prefer to use abalone shells for such material. For best use I find that the shells should first be heated to approximately 400 degrees Fahrenheit for approximately 45 minutes. This causes dehydration whereby they can be flaked into many colorful pieces.

As a final operation a third "pour" 7 is added. It covers the material 6 completely as shown in FIG. 6. It is of the same composition and amount as the first two "pours" except that a desired pigment may be mixed therein for coloration. Black is an excellent color for an attractive finished product.

Finally a backing 8 can be added over "pour" 7. This is preferably a cork sheet secured to the outer surface. Such backing serves as a base when the product is used as a trivet. Also a loop of cord 9 may be added so that the product can be suspended from a wall as an ornamental plaque.

Having described my invention, I claim:

1. The method of making simulated inlaid designs comprising the steps of:
   (a) heating abalone shells to approximately 400 degrees Fahrenheit for approximately 45 minutes and flaking same into multiple pieces,
   (b) pouring a polyester resin, mixed for solidifying, into a desired form,
   (c) pouring a second such substance over this said third resin when the first resin is partially hardened,
   (d) immersing a plastic sheet, provided with a transparent design, into the second substance whereby it becomes laminated between said first and second resins,
   (e) placing said flaked abalone shells into said second such sbstance completely covering the area of said design, and,
   (f) sealing said combination of the foregoing items by pouring a like resin over said shells whereby they are completely covered.

2. The claim according to claim 1 above wherein a backing of cork sheet is secured to the exposed surface of the last mentioned resin.

3. The claim according to claim 1 above wherein a means for suspending the formed product is affixed to said product.

References Cited

UNITED STATES PATENTS

| 2,817,619 | 12/1957 | Bickel et al. | 156—245 X |
|---|---|---|---|
| 3,062,604 | 11/1962 | Hodgen | 161—5 X |
| 3,072,973 | 1/1963 | Barnette | 264—308 X |
| 3,328,499 | 6/1967 | Barnette | 264—108 |

FOREIGN PATENTS 870,020   6/1961   Great Britain.

JOHN T. GOOLKASIAN, Primary Examiner
R. A. KILLWORTH, Assistant Examiner

U.S. Cl. X.R.
161—5, 6, 162; 264—108, 247, 308